United States Patent [19]

McCord

[11] Patent Number: 5,230,952
[45] Date of Patent: Jul. 27, 1993

[54] SINTERED COMPOSITE FRICTION MATERIAL COMPRISING FLUOROCARBON RESIN

[75] Inventor: H. Lee McCord, Longview, Tex.
[73] Assignee: Coltec Industries Inc., New York, N.Y.
[21] Appl. No.: 717,221
[22] Filed: Jun. 17, 1991
[51] Int. Cl.$^5$ .............................. B32B 5/06
[52] U.S. Cl. .................... 428/297; 188/251 A; 192/107 M; 428/329; 428/367; 428/368; 428/395; 428/421; 428/422; 523/153; 523/156; 523/157
[58] Field of Search ............... 428/297, 329, 367, 368, 428/395, 421, 422; 192/107 M; 188/251 A; 523/153, 156, 157

[56] References Cited

U.S. PATENT DOCUMENTS

| | | | |
|---|---|---|---|
| 4,045,402 | 8/1977 | Bjerk et al. | 523/156 |
| 4,593,802 | 7/1986 | Danko, Jr. | 192/107 M |
| 4,656,203 | 4/1987 | Parker | 523/155 |
| 4,762,216 | 8/1988 | Pusatcioglu et al. | 192/107 M |
| 5,004,497 | 4/1991 | Shibata et al. | 75/229 |

Primary Examiner—Paul J. Thibodeau
Assistant Examiner—Hoa T. Le
Attorney, Agent, or Firm—Richard W. Watson

[57] ABSTRACT

A sintered fluorocarbon resin based composite friction material having a high coefficient of friction, greater hardness, good machineability and improved wear resistance. The composite material comprises a homogeneous blend of fluorocarbon resin, aramid and carbon fibers, aluminum oxide and polyester compound. Also provided are process steps required to produce such materials with the desired characteristics of homogeneity, hardness and wear resistance. These steps include a premix together of the fiber components and final sintering at a pressure of about 1600 psi.

5 Claims, 2 Drawing Sheets

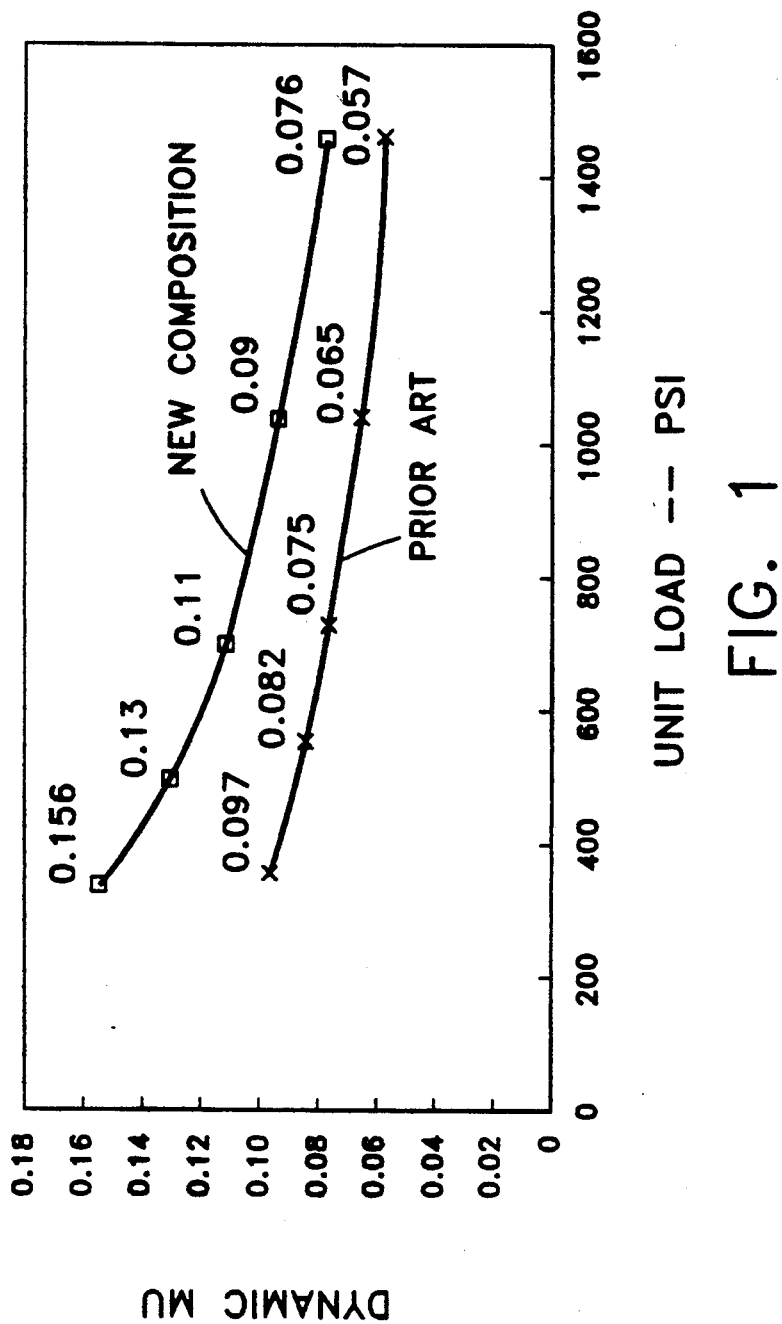

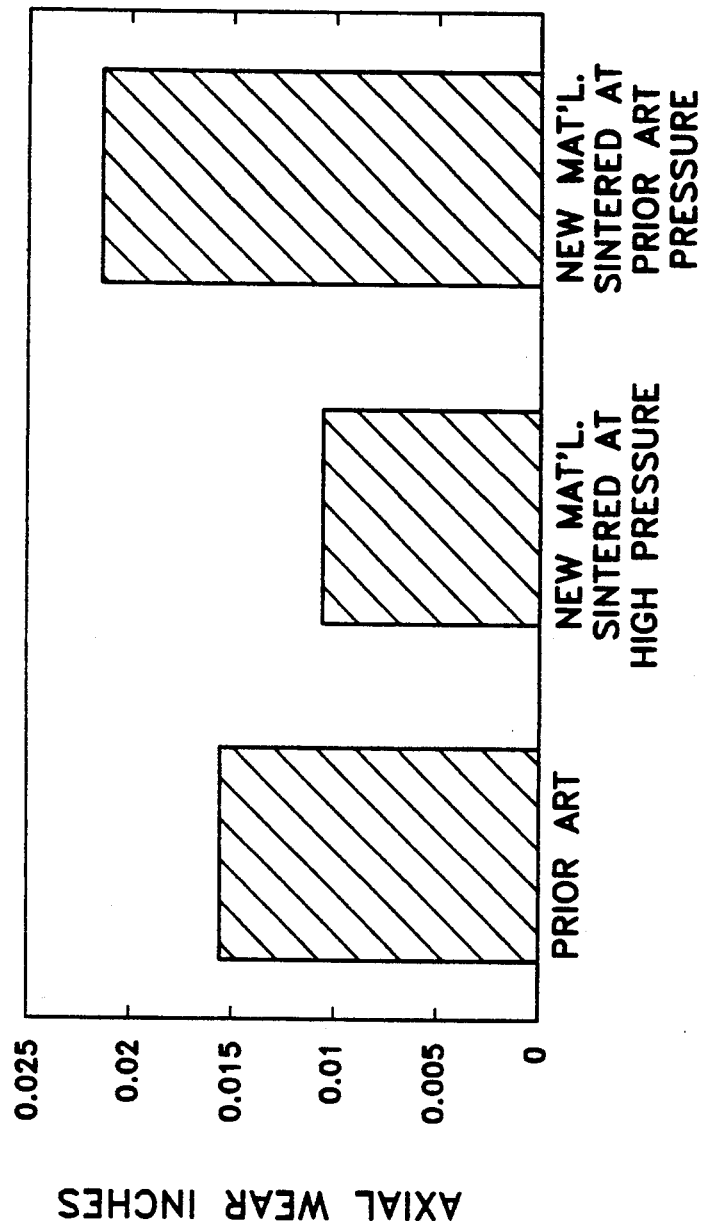

SINTERED COMPOSITE FRICTION MATERIAL COMPRISING FLUOROCARBON RESIN

BACKGROUND OF THE INVENTION

1. Field of the Invention

The present invention relates broadly to a composite fluorocarbon resin based friction material having a higher dynamic coefficient of friction and greater resistance to compression. The invention also relates to the method of making the composite material.

2. Background Information

Composite fluorocarbon resin based friction materials have been available for many years and have provided superior performance in many applications. Of particular value have been materials having a polytetrafluoroethylene (PTFE) resin base. The use of PTFE in friction materials leads to smoother engagement of clutches, synchronizers and the like. These materials also exhibit a more stable dynamic coefficient of friction in relation to applied pressure and outstanding wear resistance, as well as chemical resistance and absorption of particles.

Many such composite materials are known utilizing a wide variety of both fibrous and particulate fillers. U.S. Pat. No. 4,593,802 describes several fluorocarbon, resin based compositions which utilize particulate and/or fibrous fillers with preferred compositions comprising primarily PTFE and elemental, particulate carbon. The dynamic coefficient of friction remains more stable throughout its service life, but the values are on the order of 0.08 to 0.13. Hereafter, in this specification, references to coefficients of friction are to be understood to mean dynamic such coefficients unless specifically referred to as static coefficients.

Additional compositions, especially ones with ceramic fiber filled PTFE, are described in U.S. Pat. No. 4,762,216. However, there is no suggestion that these composites would have higher coefficients of friction. U.S. Pat. No. 4,374,211 describes still more composites including ones with aramid fibers and thermosetting resin binders. The specification is indefinite as to the coefficient of friction in that the patent FIG. shows values of from about 0.0045 to 0.0036, while Table III of the patent shows values from about 0.35 to about 0.50. However, either range is unsuited to many applications.

While these and other prior composites have performed well in many applications, other applications have been unable to use PTFE materials because the coefficient of friction has been too low and wear rates have been too high, especially in those applications involving high engagement pressures.

SUMMARY OF THE INVENTION

These and other difficulties are overcome by providing a PTFE resin based friction material containing a fiber blend of aramid and carbon plus a mixture of polyester compound and aluminum oxide. The resulting composites exhibit a greater coefficient of friction than prior PTFE based composites as well as enhanced compression resistance and lower wear rates and good machineability. Also described is the mixing sequence needed to assure a homogeneous blend of the several components and a sintering process which helps to enhance the hardness and the wear characteristics of the composite material.

Thus it is a primary object of the invention to provide a PTFE based friction material having a higher coefficient of friction, greater hardness and improved wear resistance at higher operating pressures.

It is a further object to provide such a material without sacrificing other operational qualities such as chemical resistance and smooth operation.

It is a still further object to provide a process for preparing such improved composite materials having a thoroughly homogeneous structure and greater hardness.

BRIEF DESCRIPTION OF THE DRAWINGS

A fuller understanding of the present invention will be gained by reference to the following detailed description when read in conjunction with the attached drawing in which:

FIG. 1 is a graph showing a comparison of coefficients of friction.

FIG. 2 is a graph showing a comparison of wear rates.

DESCRIPTION OF THE PREFERRED EMBODIMENT

Industry has had need of a friction material with a higher coefficient of friction and better wear resistance than has been available in fluorocarbon resin based composites without sacrifice of the advantages of such prior composites. The present invention provides not only such a product, but also a method whereby this material may be produced. Since polytetrafluoroethylene (PTFE) is presently the resin of choice, the following detailed description will be specific to such resin. However, it will be understood that other fluorocarbon resins may, at times, be used to advantage.

The friction material of the invention comprises an intimate and homogeneous mixture of PTFE resin, aramid fiber, carbon fiber, polyester compound and aluminum oxide. The retention of a PTFE resin base helps to maintain desirable functional characteristics such as:

(a) smooth engagement which enhances the "feel" of shifting,
(b) nearly equal and stable static and dynamic coefficients of friction which reduces or eliminates stick-slip and chatter,
(c) a softer surface which conforms more readily to the opposed surface and
(d) a capability to absorb foreign particles without a significant effect on performance.

In numerous applications, previously available PTFE friction materials have not been fully satisfactory for a variety of reasons. Sometimes the applied pressure has been too great for efficient performance, sometimes greater operational speed has been required, sometimes more complex (and expensive) component designs have been necessary for proper performance.

In accord with the present invention, friction material has now been compounded with a PTFE content of about 40%–60% by weight, preferably below 50%. This lower percentage of PTFE resin and the resulting higher percentage of filler is unique as compared to previous friction materials. Aramid fibers, such as Dupont Kevlar, comprise about 15%–20% of the new composite and contribute to its unique frictional characteristics. Preferably, the aramid pulp fiber form is used. More preferably, the average length of the pulp fiber is about 2 mm. Carbon fibers comprise about 10%–20% of the mixture and serve an important role in that they seem to enhance remarkably the machinability of the present material. Such fibers also help to improve the low force characteristics in that materials which include carbon fiber have a smoother engagement or less "grab" when they contact opposing surfaces. Thus, while other components and properties of Examples 6 and 7 shown in Table I are quite comparable, the material of Example 6 has no carbon fiber and does not engage well.

Preferably, the carbon fiber content of the composite material is less than that of the aramid fiber. A preferred ratio is 1.5 parts aramid fiber to 1.0 part carbon fiber.

allows very limited Wear before such equipment will no longer function properly. The bar graph of FIG. 2 illustrates quite dramatically how the material of the invention provides better wear performance than prior art PTFE composites as well as new composites sintered according to prior art methods.

In Table I, data relative to several Examples are tabulated to help to illustrate the effects of several variables. Thus, in Examples 1–5, various fiber combinations were tried with sintering carried out at prior art pressure. In each instance, the coefficient of friction was higher than in the prior art but the wear rate was excessive.

TABLE 1

| EXAMPLE NO. | 1 | 2 | 3 | 4 | 5 | 6 | 7 |
|---|---|---|---|---|---|---|---|
| COMPOSITION |  |  |  |  |  |  |  |
| PTFE | 41.7% | 50.0% | 40.0% | 50.0% | 40.0% | 38.10% | 45.8% |
| Aramid Fiber | 37.5% | 32.0% | 24.0% | 17.1% | 20.0% | 42.86% | 15.6% |
| Carbon Fiber | 0.0% | 0.0% | 16.0% | 11.4% | 20.0% | 0.00% | 10.5% |
| Aluminum Oxide | 10.4% | 9.0% | 10.0% | 12.5% | 10.0% | 9.52% | 16.6% |
| Polyester Comp. | 10.4% | 9.0% | 10.0% | 9.1% | 10.0% | 9.52% | 11.5% |
| SINTERING PRESSURE | 800 | 800 | 800 | 800 | 800 | 1600 | 1600 |
| COEFF. OF FRICTION AT 1447 PSI | 0.114 | 0.109 | 0.084 | 0.100 | 0.082 | 0.090 | 0.076 |
| SHORE A HARDNESS | 52-55 | 50 | 55-60 | 55-61 | 56-60 | 60-70 | 60-70 |
| WEAR | .015" | .017" | 0.19" | .018" | .016" | .009" | .009" |

Excessive carbon fiber content will tend to lower the coefficient of friction. Optimum length of the carbon fibers is about 400 microns. Aluminum oxide comprises about 9%–18% of the composite and also contributes to the higher coefficient of friction. The use of higher proportions of the oxide inhibits obtaining properly homogeneous mixtures. As means for improving the compression resistance or hardness of the composite, a polyester compound, such as Ekonol from Carborundum Division of Standard Oil Company is included to comprise about 10%–15% of the mixture. The preferred ratio of PTFE to polyester is about 4 to 1. The most preferred composition, at present, comprises 45.8% PTFE, 15.6% aramid pulp, 10.5% carbon fiber, 16.6% aluminum oxide and 11.5% polyester compound.

In FIG. 1, there is shown a comparison of the coefficients of friction of prior art materials and materials according to the invention at various unit loads.

It was discovered during the development process that the aramid fiber and the carbon fiber would no mix well in a standard slurry mixing operation. However, by adding a preliminary step of dry mixing the two fibers in a standard industrial mixer prior to slurry mixing, a much more nearly homogeneous mixture is obtained. It has also been found that fiber dispersion is substantially enhanced by conducting the slurry mixing in a two-step sequence. First the aluminum oxide is added and after that is thoroughly mixed with the fiber, the PTFE and polyester resins are added and mixed with the fibers and the aluminum oxide. Upon completion of slurry mixing the excess liquid is drawn off and the resulting cake is oven dried to remove remaining moisture.

The oven dried cake is then pressure sintered to sheet form by processes which are well known except that I have found that by approximately doubling the sintering pressure to about 1600 psi, a finished product with a Shore A hardness in the range of 60 to 70 is obtained. Materials sintered at about 800 psi exhibit Shore A hardnesses in the 50 to 60 range. The new material is more compression resistant and more readily machined to its final configuration. Also, the wear rate of composites sintered at such higher pressures is about one-half that of similar composites sintered at lower pressures.

Wear qualities or wear rates of friction materials are important in many applications, such as synchronizers in automotive transmissions, where the whole design The material of Example 6 has a good (low) wear rate, but as noted previously, When carbon fiber is omitted, this material exhibits poor machineability and poor low force engagement when operated in a synchronizer or the like. The material of Example 7 is according to the invention and shows a higher coefficient of friction than the prior art and a good wear rate. It is also readily machineable and engages smoothly at low force levels.

While preferred embodiments of the invention have been shown and described in detail, other modifications will be readily apparent to those skilled in the art of friction materials and methods for their fabrication. Thus, the preceding specification should be interpreted as exemplary rather than as limiting and the scope of the invention is defined by the following claims.

I claim:

1. A sintered composite friction material having a dynamic coefficient of friction between 0.075 and 0.16 and a Shore a hardness between 60 and 70 and comprising a blend by weight of from about 40%–60% polytetrafluoroethylene resin, about 15%–20% aramid fiber, about 10%–20% carbon fiber, about 10%–20% polyester compound and about 9%–18% aluminum oxide.

2. The material according to claim 1 wherein the ration of aramid fiber to carbon fiber is about 1.5 to 1.0.

3. The material according to claim 1 wherein the aramid fiber is aramid pulp.

4. The material according to claim 3 comprising 48% polytetrafluoroethylene resin, 15.6% aramid pulp, 10.5% carbon fiber, 16.6% aluminum oxide and 11.5% polyester compound.

5. A method of making a sintered composite friction material according to any of claims, 1, 2, 3 or 4, said method comprising:
 (a) dry mixing the aramid fiber and the carbon fiber,
 (b) slurry mixing the aluminum oxide and the fiber blend,
 (c) slurry mixing the polyester and the fluorocarbon resin with the mixture of step (b),
 (d) forming the mixture of step (c) into a sheet
 (e) removing the moisture from said sheet and
 (f) sintering the dried sheet at a pressure of about 1600 psi.

* * * * *